(12) United States Patent
Kosaka

(10) Patent No.: US 6,687,515 B1
(45) Date of Patent: Feb. 3, 2004

(54) WIRELESS VIDEO TELEPHONE WITH AMBIENT LIGHT SENSOR

(75) Inventor: Akio Kosaka, Chiryu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/390,452

(22) Filed: Sep. 7, 1999

(30) Foreign Application Priority Data

Oct. 7, 1998 (JP) .......................................... 10-285251

(51) Int. Cl.[7] .............................. H04B 1/38; H04M 1/00
(52) U.S. Cl. .................. 455/566; 455/556.1; 348/14.02
(58) Field of Search ................................ 455/566–575, 455/351, 90, 556, 157.2, FOR 121, 575.1, 90.3, 556.1, 66.1, 550.1; 379/433.04, 29.1; 345/169, 905; 348/14.01, 14.02, 552, 14.04, 14.08, 14.09, 14.1, 14.03

(56) References Cited

U.S. PATENT DOCUMENTS

| | | | | |
|---|---|---|---|---|
| 5,485,504 A | * | 1/1996 | Ohnsor ........................ | 455/566 |
| 5,510,829 A | * | 4/1996 | Sugiyama et al. ......... | 348/14.01 |
| 5,689,800 A | * | 11/1997 | Downs ......................... | 725/114 |
| 5,734,439 A | * | 3/1998 | Wirbitzki et al. ............ | 348/602 |
| 5,790,957 A | * | 8/1998 | Heidari ........................ | 455/553 |
| 5,893,037 A | * | 4/1999 | Reele et al. ................. | 455/556 |
| 6,085,112 A | * | 7/2000 | Kleinschmidt et al. ...... | 455/556 |
| 6,122,526 A | * | 9/2000 | Parulski et al. .............. | 455/556 |
| 6,275,714 B1 | * | 8/2001 | Kintz et al. .................. | 455/566 |
| 6,310,609 B1 | * | 10/2001 | Morgenthaler ............... | 345/169 |
| 6,392,697 B1 | * | 5/2002 | Tanaka et al. ............ | 348/220.1 |

FOREIGN PATENT DOCUMENTS

| | | |
|---|---|---|
| JP | A-2-119390 | 5/1990 |
| JP | A-6-30407 | 2/1994 |
| JP | 6141214 | 5/1994 |
| JP | 6197270 | 7/1994 |
| JP | 2000092464 | 3/2000 |
| JP | 2000115731 | 4/2000 |

OTHER PUBLICATIONS

Notice of Rejection, Application No. 11–282691, Date of Notice: Aug. 9, 2002.

* cited by examiner

*Primary Examiner*—Sinh Tran
*Assistant Examiner*—Eliseo Ramos-Feliciano
(74) *Attorney, Agent, or Firm*—Harness, Dickey & Pierce, PLC

(57) ABSTRACT

A communication device such as a portable video telephone capable of transmitting images as well as sound is capable of preventing the transmission of dark and featureless images resulting from the device being used in a dark location. When an image is to be transmitted, a device controller determines if the present ambient light level is too dark by measuring the light level of a light sensor. If the ambient light is inadequate, the controller generates a brightness warning on the device display, and stops image transmission.

40 Claims, 4 Drawing Sheets

WIRELESS VIDEO TELEPHONE WITH AMBIENT LIGHT SENSOR

CROSS-REFERENCE TO RELATED APPLICATION

The present application is related to, and claims priority from, Japanese Patent Application No. Hei. 10-285251, the contents of which are incorporated herein by reference.

BACKGROUND OF THE INVENTION

Recently, through research and development of W-CDMA and the like, portable video telephones using wireless communication technology have been developed that are capable of communicating image data as well as voice data. With conventional video telephones, because the phones are fixed within a room, it is possible to secure enough light to pick up and transmit images by illuminating the room.

However, a portable video telephone is not always used in locations where there is enough light to illuminate an image to be transmitted. Consequently, when a video telephone is used in dim light, a dark and featureless image may be transmitted.

SUMMARY OF THE INVENTION

It is therefore an object of the present invention to provide a wireless communication device capable of inhibiting the transmission of images which are featureless due to insufficient lighting.

More particularly, the present invention provides a communication device including a display for displaying messages. A voice transmitter transmits voice data, and an image transceiver receives and transmits image data. A light measuring device measures the ambient light level, and a controller in communication with the light measuring device generates a message on the display indicating that the light level is inadequate when the light level is measured by the light measuring device to be lower than a predetermined level.

With the communication device of the present invention, because it is possible to warn a user that the present ambient light level is inadequate, the user can move to a location having a sufficient level of light, or increase the level of light in the present location, so that image data can be properly transmitted.

DETAILED DESCRIPTION OF THE PREFERRED EMBODIMENTS

Figure 1:
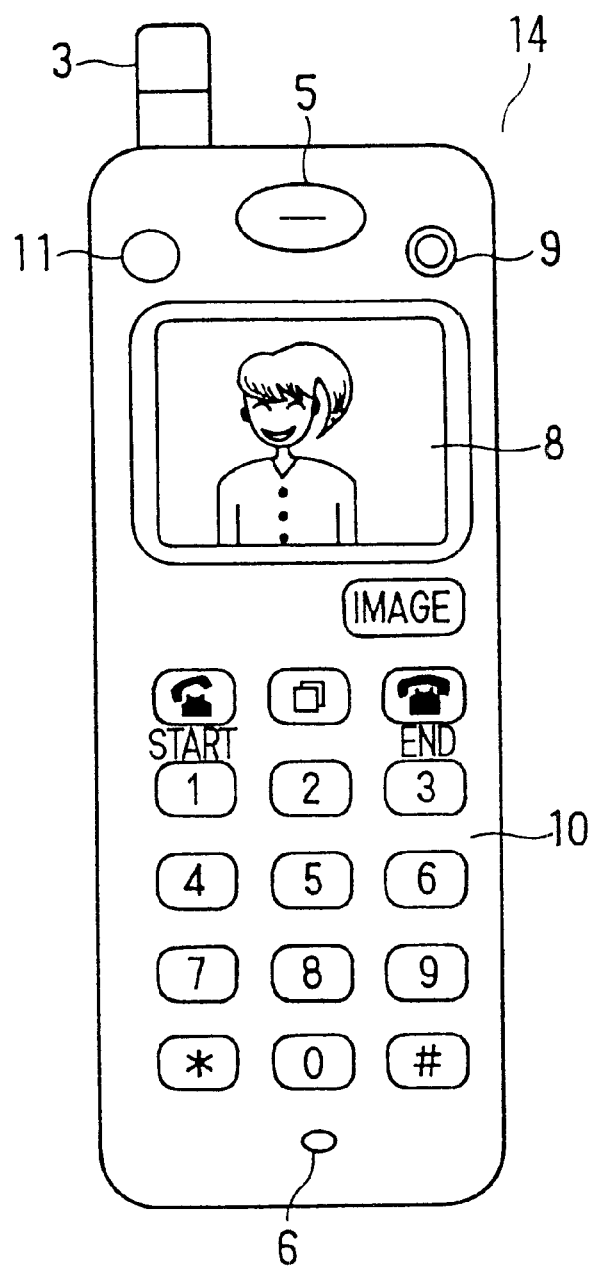
FIG. 1 is top plan view showing the exterior of a communication device according to both of the first and second preferred embodiments.

As will now be described, a portable video telephone according to first and second embodiments of the present invention and shown in FIG. 1 is capable of simultaneously communicating voice and image data. It should be noted that CDMA (Code Division Multiple Access) communication, using diffusion codes, is preferably used as the mode of communication.

The structure of the first preferred embodiment will be described with reference to FIGS. 1 and 2. As shown therein, a microcomputer-based controller 1 includes input and output ports connected to signal input and output terminals of a wireless transceiver 2. A terminal of the wireless transceiver 2 is in turn connected to an antenna 3. Also, input and output ports of the controller 1 are connected to input and output terminals of a voice processor 4. Output- and input terminals of the voice processor 4 are respectively connected to a speaker 5 serving as a voice output device and a microphone 6 serving as a voice input device.

Additional input and output ports of the controller 1 are connected to input and output terminals of an image processor 7, and input and output terminals of the image processor 7 are respectively connected to a display 8 and an image input camera 9. An input port of the controller 1 is also connected to a keypad 10 serving as a switch. The keypad 10 has various keys such as a POWER key, a START key, an END key, number keys '0' through '9' and an IMAGE key.

Figure 2:
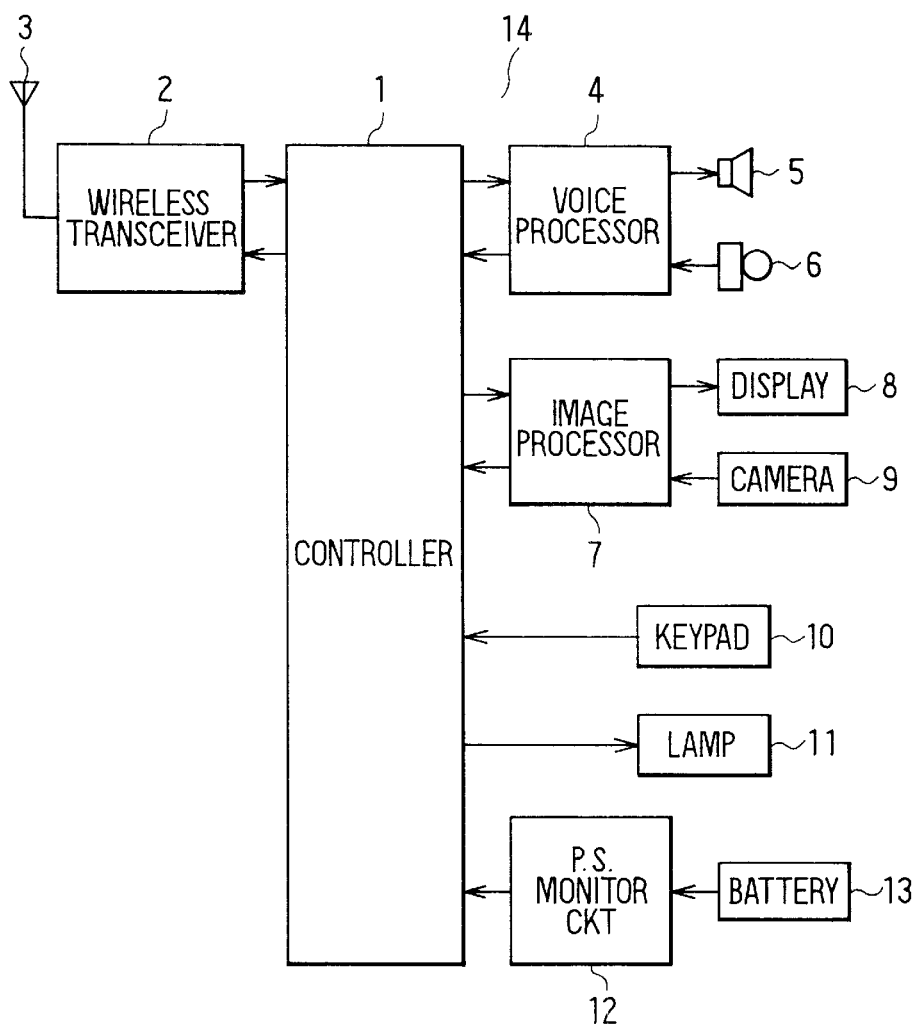
FIG. 2 is a block diagram showing the electronic construction of the first preferred embodiment as well as a second preferred embodiment.

In operation, when the POWER key of the keypad 10 is pressed by a user, power is supplied to the electronic circuit shown in FIG. 2, and the antenna 3 picks up radio waves from the base station in the vicinity having the strongest field strength, and feeds the waves to the wireless transceiver 2 as a received high-frequency signal. The wireless transceiver 2 converts the high-frequency signal into a base band signal through an antenna sharer (not shown), a high-frequency amplifier (not shown) and a reception mixer (not shown) before feeding the signal to the controller 1. The controller 1 obtains announcement information by demodulating the received base band signal. When the controller determines from the obtained announcement information that position registration is necessary, it converts position registration information into a transmission base band signal and feeds the signal to the wireless transceiver 2. The wireless transceiver 2 converts the transmission base band signal into a transmission high-frequency signal via a transmission mixer and transmits the high-frequency signal from the antenna 3 as a radio wave by way of a transmission power amplifier and the antenna sharer. In this way, the portable video telephone 14 assumes a standby state.

During call initiation, a user inputs a telephone number via the keypad 10, and the controller 1 displays this telephone number on the display 8 by way of the image processor 7. When after checking the number, the caller sets up a call by pressing the START key, and a person at the receiving end of the call answers the call, the caller's voice is converted into an electronic signal by the microphone 6 and is input into the voice processor 4 as a transmission voice signal. The transmission voice signal passes through an internal amplifier (not shown) and an A/D converter (not shown) and is thereby converted into a digital signal. The digital voice signal then passes through a voice encoding circuit (not shown) and is compressed before being input into the controller 1 as a reduced bit rate transmission voice data signal.

If the radio wave state is good and high-speed data communication of 64 kbps or above is possible, when the caller presses the IMAGE key on the keypad 10, a caller side image is converted into an electrical signal by the camera 9 and is input into the image processor 7 as a transmission image signal. The transmission image signal input into the image processor 7 passes through an amplifier and an A/D converter inside the image processor 7 and is thereby converted into a digital signal. Thereafter, the digital signal passes through an image encoding circuit (not shown) and is compressed before being input into the controller as a reduced bit rate transmission image data signal.

The controller 1 performs CDMA processing and digital modulation on the input voice and image data signals and sends the signals to the wireless transceiver 2 as transmission base band signals. The wireless transceiver 2 converts the transmission base band signals into transmission high-frequency signals and passes the signals through a high-frequency power amplifier and an antenna sharer before transmitting the signals to a base station from the antenna 3 as radio waves.

In the above-described transmission, radio waves transmitted from the base station are received by the antenna 3 of the telephone on the receiving end of the call and fed to the wireless transceiver 2 as received high-frequency signals. The wireless transceiver 2 converts the received high-frequency signals into received base band signals through the antenna sharer, the high-frequency amplifier and the reception mixer and feed the signals to the controller 1. The controller performs demodulation and CDMA processing on the received base band signals and converts the signals into received voice data and received image data before feeding the data to the voice processor 4 and the image processor 7, respectively.

The received voice data fed to the voice processor 4 is decompressed by a voice decoding circuit and becomes a received voice digital signal; which is converted by a D/A converter into an analog received voice signal before being fed through an amplifier to the speaker 5. The speaker 5 then converts the received voice signal into sound. The received image data fed to the image processor 7 is decompressed by an image decoding circuit and becomes a received image digital signal which is fed to the display 8 which displays this received image signal.

During an incoming call, with the communication device in the standby state, an incoming call message is transmitted from a base station, and is received by the antenna 3 and converted into a base band signal by the wireless transceiver 2. The controller 1 processes the base band signal and, recognizing that there has been an incoming call message, performs an incoming call operation to set up a call. Device operation after call set-up is the same as in the case of an outgoing call.

A battery 13 supplies power to the different portions of the circuit. If the remaining energy of the battery 13 is ample, the voltage of the battery 13 is high, and if the remaining energy becomes low the voltage of the battery 13 becomes low. A power supply monitoring circuit 12 monitors the voltage of the battery 13 with an A/D converter circuit, converts the analog value of the voltage into a digital value, and inputs the digital voltage to the controller 1. The controller 1 calculates the remaining energy of the battery 13 based on the digital value of the battery voltage input from the power supply monitoring circuit 12. A lamp 11 indicating low power can be switched on and off via the controller 1.

Specific operation of the present invention according to the first preferred embodiment at the time of an outgoing call will now be described with reference to the flow diagram of FIG. 3. When a caller inputs a telephone number of a receiving party via the keypad 10, or inputs a telephone number of a receiving party by operating a speed dialing key, and then presses the START key of the keypad 10, the controller 1 leaves a main routine and shifts into an interrupt routine shown in FIG. 3. When this happens, the controller 1 moves to processing step S1, and sets the communication speed to 8 kbps before proceeding to processing step S2.

At step S2 the controller 1 operates the voice processor 4 and reproduces voice data from the called party side through the speaker 5. The controller also causes voice from the caller to be input into the voice processor 4 via the microphone 6, thereby establishing a voice communication mode.

The controller 1 then proceeds to step S3, where it detects whether or not the IMAGE key of the keypad 10 has been pressed. When the IMAGE key has not been pressed, the controller 1 returns to step S1 and repeats the foregoing processing. When the IMAGE key has been pressed, it proceeds to processing step S4 and measures the illumination level by sensing the intensity of ambient light input through a light-receiving part of the camera 9 and the image processor 7.

The controller 1 then proceeds to step S5, where it compares the light level measured at step S4 with a preset threshold value. When the light level is such that transmission of an image is possible, the controller 1 proceeds to processing step S9 and sets communication speed to 64 kbps. When light intensity is inadequate for image transmission, the controller 1 proceeds to processing step S6, where it sets the communication speed to 8 kbps before proceeding to processing step S7.

At step S7 the controller 1 operates the voice processor 4 and causes voice data from the called party side to be reproduced by the speaker 5, and by means of the microphone 6 causes voice data from the caller to be input into the voice processor 4, thereby establishing a voice communication mode. The controller 1 then proceeds to step S8 and shows on the display 8 by way of the image processor 7 a 'light level inadequate' message before returning to processing step S4. The processor then repeats the foregoing processing.

When the determination at step S5 is NO, if a 'light level inadequate' message shown on the display 8 the display is canceled, the communication speed is set to 64 kbps, and the controller 1 proceeds to processing step S10, where it operates the image processor 7 and causes a called party side image to be reproduced on the display 8 by means of the image processor 7. The controller then transmits an image of the caller to the image processor 7 by means of the camera 9, thereby establishing an image communication mode. The controller also reproduces voice data from the called party side via the speaker 5 by means of the voice processor 4, and causes voice data from the caller to be input into the voice processor 4 by means of the microphone 6, thereby establishing a voice communication mode. Because both the image and voice communication modes are established, the communication device communicates both image and voice data.

The controller 1 then returns to step S4 and repeats the above processing. By measuring the light entering the light-receiving part of the camera 9 in the above-described way, the present invention of the first preferred embodiment provides many advantages, as will now be described.

The controller causes a 'light level inadequate' message to be displayed on the display 8 when the ambient light level is low. Therefore, the user is alerted to the fact that the light level is inadequate, and can move to a brighter location or take other appropriate action. Also, because when the IMAGE key of the keypad 10 is pressed, the controller 1 checks the light level. When the light level is low, the controller causes a 'light level inadequate' message to be displayed on the display 8, and the user is alerted so that he or she can subsequently take appropriate measures.

Because the controller 1 measures the light level of the light-receiving part of the camera 9 and cancels the 'light level inadequate' display when there is a change from an inadequate light level state to an adequate light level state, the user knows when illumination sufficient for image transmission is obtained, and therefore he or she can transmit image data with confidence.

Because the controller 1 sets the communication speed to 8 kbps and switches to a voice communication mode only when the light level is low, transmission of completely dark, indiscernible images is prevented and power consumption is reduced so that the battery lasts longer. Also, the controller 1 can display either an 'inadequate brightness' message or a received image on the display 8. Therefore, a special dedicated display device is not necessary, and the size and weight of the telephone is further reduced.

The present invention is not limited to the preferred embodiment described above and shown in the drawings, and various extensions and modifications are possible. For example, although the preferred embodiment described above generates an 'inadequate brightness' message on the display 8 along with received images, alternatively the message may be displayed using a separate display, such as an LED or the like. In addition, although in the preferred embodiment described above the light level was measured by the camera 9, a separate light measuring device may alternatively be provided. Finally, although in the preferred embodiment described above the display 8 was used to indicate an inadequate light level, an inadequate light level may alternatively be audibly indicated.

Figure 4:
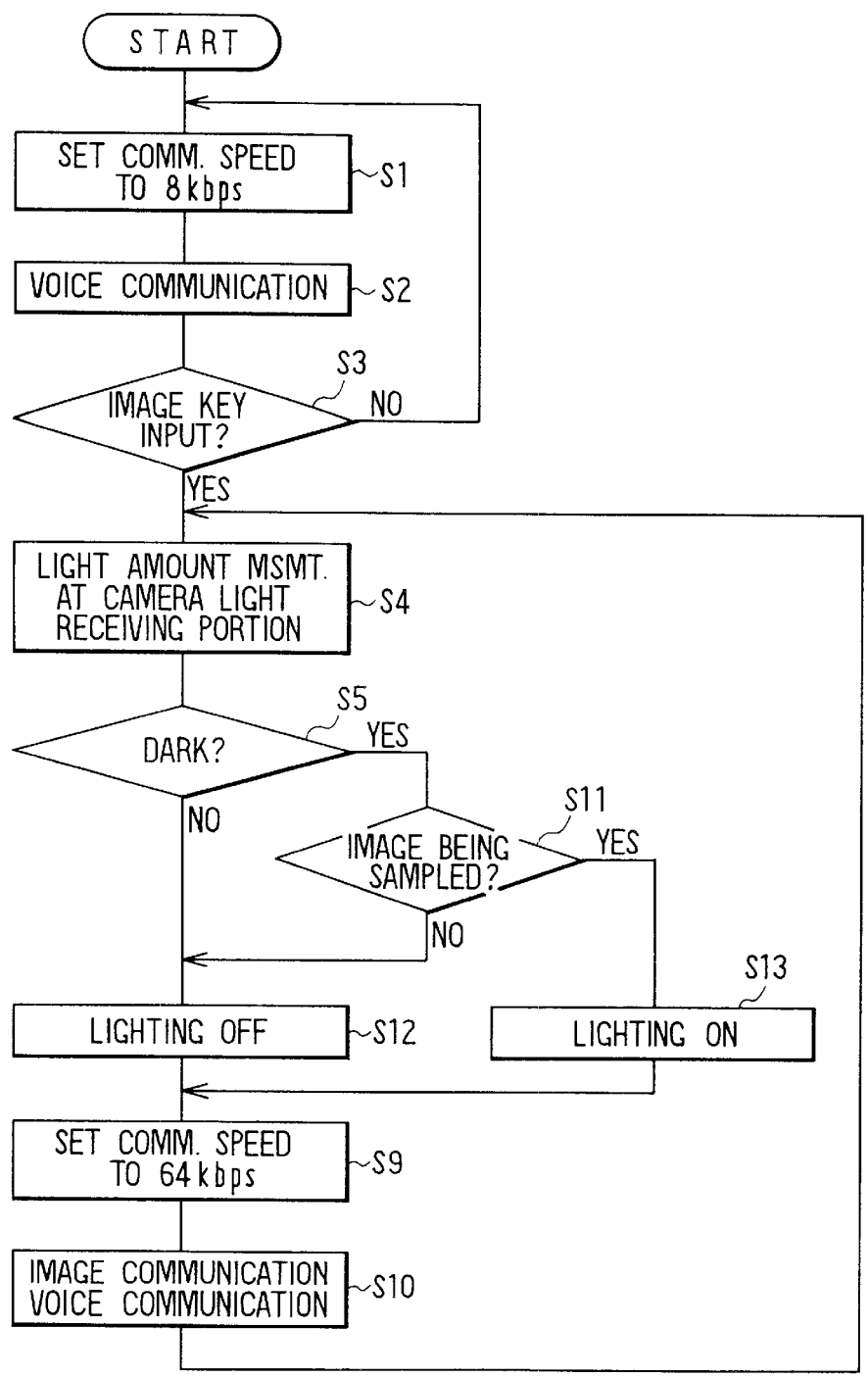
FIG. 4 is a flow diagram showing the control methodology of the second preferred embodiment.

FIG. 4 shows the processing methodology of a second preferred embodiment of the invention during processing of an outgoing call. Parts in the second preferred embodiment that are identical to parts in the first preferred embodiment have been given the same reference numerals and therefore will not be described again. The electronic construction of the second preferred embodiment is the same as the first embodiment as shown in FIG. 2.

Figure 3:
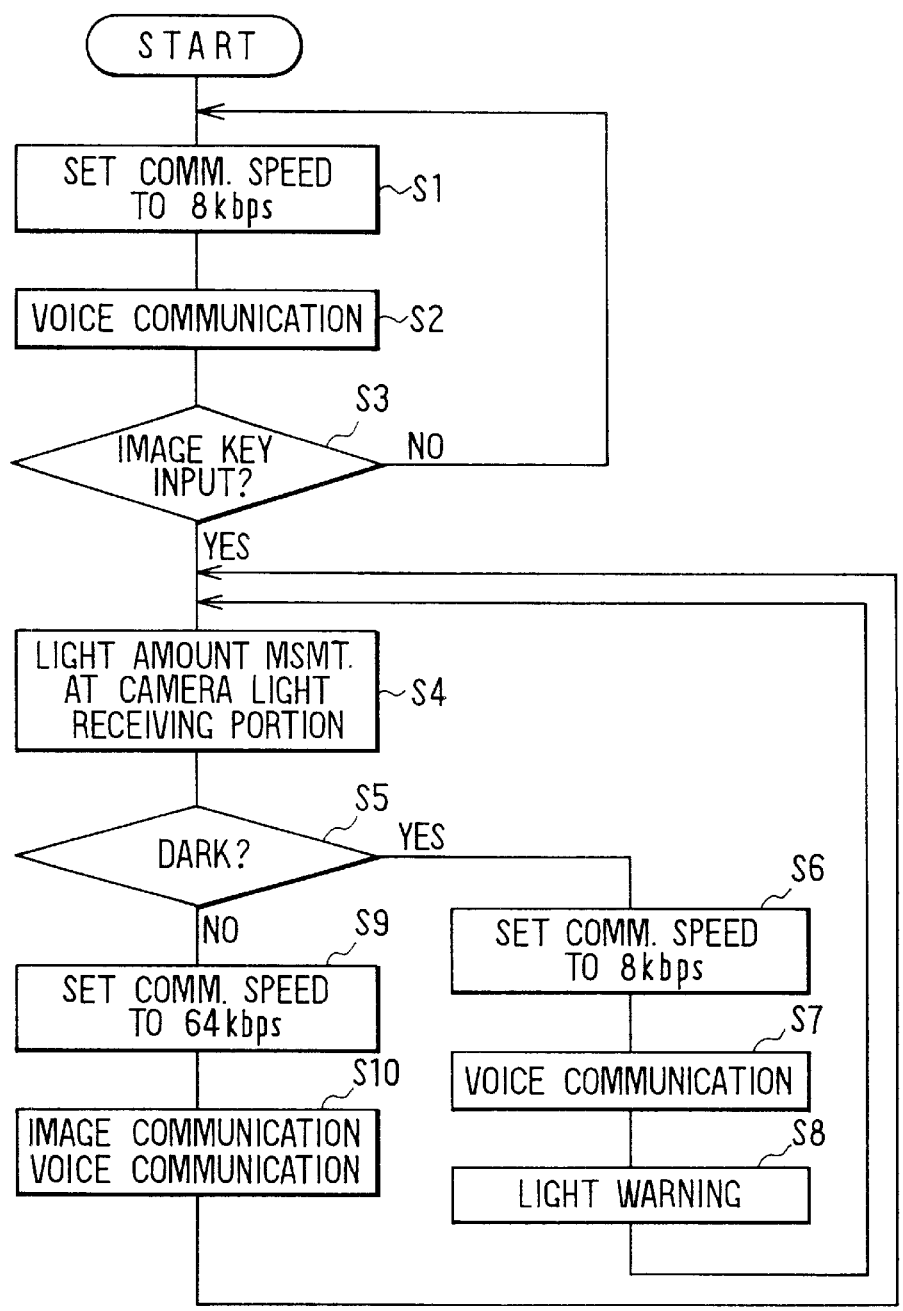
FIG. 3 is a flow diagram showing the control methodology of a first preferred embodiment of the present invention.

When a caller inputs a telephone number of a party to be called by operating the keypad 10 or a speed dialing key, and then presses the START key, the controller 1 leaves a main routine and shifts into an interrupt routine as shown in FIG. 3. At this time, the controller 1 moves to step S1 and sets the communication speed to 8 kbps before proceeding to processing step S2.

At step S2 the controller 1 reproduces voice data from the called party side through the speaker 5 and inputs voice data from the caller into the voice processor 4 via the microphone 6, thereby establishing a voice communication mode.

The controller 1 then proceeds to step S3 where it detects whether or not the keypad IMAGE key has been pressed. When the IMAGE key has not been pressed, the controller 1 returns to step S1 and repeats the foregoing processing. When the IMAGE key has been pressed, it proceeds to step S4 and measures the light level by passing the intensity of light input into a light-receiver of the camera 9 through the image processor 7.

The controller 1 then proceeds to step S5 and compares the light level measured at step S4 with a preset threshold value. When the light level is such that image transmission is possible, the controller 1 proceeds to step S12. When the light level is inadequate for image transmission, the controller proceeds to step S11, where it determines whether or not an image is being sampled with the camera 9. If an image is not being sampled, processing proceeds to step S12. If an image is being sampled, processing proceeds to step S13 and switches the lamp 11 on if it is off before proceeding to step S9.

At step S12 the controller switches the lamp 11 off if it is on, and then proceeds to step S9, where it sets the communication speed to 64 kbps before proceeding to step S10. At step S10, the controller operates the image processor 7 and causes a called party side image to be reproduced on the display 8 via the image processor 7. An image of the caller is then transmitted to the image processor 7 via the camera 9, thereby establishing an image communication mode. The controller also operates the voice processor 4, causing voice data from the called party side to be reproduced by the speaker 5 via the voice processor 4. The controller then causes caller voice data to be input into the voice processor 4 via the microphone 6, thereby establishing a voice communication mode. Subsequently, because both the image communication mode and the voice communication mode have been established, the communication device communicates both image and voice data.

The controller then returns to step S4 and repeats the foregoing processing. Thus, by measuring the light level of the light-receiver of the camera 9, the second preferred embodiment provides the following advantageous features.

The controller causes the lamp 11 to be lit only when an image is being sampled when it is dark, thereby minimizing the amount of power consumed and thereby increasing the life of the battery 13.

Also, because the controller tracks the voltage of the battery 13 through the power supply monitoring circuit 12, it can calculate the remaining battery energy from the voltage value. When the calculated remaining energy is low, through the image processor 7 the controller executes control to reduce the sampling rate at which the camera 9 samples an image for transmission. Because the sampling rate at which the transmitted image is sampled and the lighting rate of the lamp 11 are the same, if the sampling rate at which the transmitted image is sampled decreases, then the time for which the lamp 11 is lit per unit time is decreased. Consequently, consumed power can be suppressed and images can be transmitted for a longer period of time.

Also, it is possible to switch via the keypad 10 between a brightness warning mode as in the first preferred embodiment and a lamp lighting mode wherein the lamp 11 is lit as in the second preferred embodiment. Further, it is possible even in the warning mode to perform an operation, such as depressing a specified key on the keypad 10 for an extended time, to invoke the lamp lighting mode for the duration of this operation.

If this is done, because it is possible to choose between showing a 'light level inadequate' message on the display 8 and using the lamp 11 when the light level is inadequate, it is possible to act in accordance with the conditions at that time. Further, when the user is in a dark location and cannot move to a brighter location, but wishes to transmit an image nevertheless, it is possible to cancel the inadequate brightness warning display and use lighting to realize transmission of a sufficiently bright image.

In addition to the first and second preferred embodiments described above, the following additional features can also be added.

That is, provision may be made for utilizing a text mailing function to transmit to a receiving party a 'no image available due to inadequate light' message when illumination is inadequate, as well as an 'inadequate brightness' message on the display 8. When this is done, the receiving party can be alerted as to the reason why the receiving party's screen is dark, and can easily understand that this is not due to a malfunction. Such a feature is not limited to the utilization of text mail, and alternatively a special control code may be prepared and transmitted, and a message such as that mentioned above then displayed when this control code is received. This control code may alternatively be used, and when the control code is received, the power supply of the respective display may be cut automatically based on the fact that only a dark image is available for display.

The present invention is not limited to the preferred embodiments described above and shown in the drawings, and various extensions and modifications are possible. For example, whereas in the preferred embodiments described above the ambient light level was measured by the camera 9, other well known light measuring devices for measuring the ambient light level may alternatively be provided.

What is claimed is:

1. A communication device comprising:
   a display;
   an image input camera for capturing first image data and for measuring an ambient light level;
   a voice data transceiver for receiving and transmitting voice data;
   an image data transceiver for transmitting the first image data and receiving second image data; and
   a controller for generating a message on the display indicating that the ambient light level is inadequate when the light level measured by the light measuring device is less than a predetermined level;
   wherein the controller inhibits an image data transmit state to limit the communications device to voice communication when the ambient light level is below the predetermined level.

2. The communication device of claim 1, further comprising an image transmit key for initiating an image data transmit state, wherein the controller generates the message indicating that the ambient light level is inadequate when both the image transmit key has been pressed and the ambient light level is lower than the predetermined level.

3. The communication device of claim 1, wherein when the ambient light level measured by the image input camera is above a predetermined level the controller enables the first image data to be transmitted by the image data transceiver.

4. The communication device of claim 1, wherein the display is also capable of displaying the second image data received from another communication device.

5. The communication device of claim 1, further comprising a lighting device for providing illumination when the ambient light level is below the predetermined level as the first image data is captured by the image input camera.

6. The communication device of claim 5, further comprising a switch for switching between the message indicating that the ambient light level is inadequate and the lighting device, wherein the controller controls the switch based on the ambient light level measured by the image input camera.

7. The communication device of claim 5, further comprising:
   an internal battery for providing power to device components;
   an energy level detector for detecting a remaining energy level of the battery; and
   a sampling rate calculator for calculating a sampling rate at which transmission image data is to be sampled by the controller based on the remaining energy level detected by the energy level detector.

8. The communication device of claim 1, wherein the image input camera measures the ambient light level based on the first image data.

9. The communication device of claim 1, wherein the communication device transmits and receives data via a wireless communication link.

10. The communication device of claim 1, further comprising a notifying device selectively activated by the controller for notifying a receiving party that the communication device is in a location where the ambient light level measured by the image input camera is below the predetermined level.

11. The communication device of claim 1, wherein a text message indicating that the ambient light level is inadequate is displayed on the display when the measured light level is less than the predetermined level.

12. The communication device of claim 1, wherein an LED lamp lights indicating that the ambient light level is inadequate when the measured light level is less than the predetermined level.

13. The communication device of claim 1, wherein an audible signal sounds indicating that the ambient light level is inadequate when the measured light level is less than the predetermined level.

14. The communication device of claim 1, wherein image transmission is inhibited and an image transmission speed is reduced when the ambient light level is determined to be inadequate.

15. The communication device of claim 1, wherein the controller can be selectively placed in a brightness warning mode or a lamp lighting mode.

16. The communication device of claim 1, wherein the controller can be switched to a lamp lighting mode by a key operation.

17. A portable communication device with both voice and image wireless transceiving capabilities, said device comprising:
   a light sensor for sensing an ambient light level; and
   a controller in communication with the light sensor for indicating that the ambient light level is inadequate for image data transmission when the ambient light level measured by the light sensor is lower than a predetermined level;
   wherein the controller inhibits an image data transmit state to limit the communications device to voice communication when the ambient light level is below the predetermined level.

18. The portable communication device of claim 17, wherein the controller indicates the light level is inadequate for image data transmission via a visual warning.

19. The portable communication device of claim 18, further comprising a display for displaying received image data, and for displaying the visual warning generated by the controller.

20. The portable communication device of claim 17, wherein the controller indicates the ambient light level is inadequate for image data transmission via an audible warning.

21. The portable communication device of claim 17, wherein the light sensor comprises a camera for both image data acquisition and for sensing the ambient light level.

22. The portable communication device of claim 17, further comprising a device keypad for inputting a receiving party telephone number and for selectively enabling transmission and reception of image data and the light sensor.

23. The portable communication device of claim 17, wherein the controller also is capable of causing transmission of text to a receiving party to indicate that a calling party inadequate ambient light condition exists.

24. The portable communication device of claim 17, further comprising a light source for providing ambient illumination when the ambient light level measured by the light sensor is below the predetermined level.

25. The portable communication device of claim 24, further comprising a switch for switching between the inadequate light level message and the light source, wherein the controller controls the switch based on the light level sensed by the light sensor.

26. The portable communication device of claim 24, further comprising:
    an internal battery for providing power to device components;
    an energy level detector for detecting a remaining energy level of the battery; and
    a sampling rate calculator for calculating a sampling rate at which transmission image data is to be sampled by the controller based on the remaining energy level detected by the energy level detector.

27. A communication device comprising:
    a display;
    an image input camera for capturing first image data and for measuring an ambient light level;
    a voice data transceiver for receiving and transmitting voice data;
    an image data transceiver for transmitting the first image data and receiving second image data; and
    a controller for generating a message on the display indicating that the ambient light level is inadequate when the light level measured by the light measuring device is less than a predetermined level so that an operator does not need to view any images;
    wherein the controller inhibits an image data transmit state to limit the communications device to voice communication when the ambient light level is below the predetermined level.

28. The communication device of claim 27, further comprising an image transmit key for initiating an image data transmit state, wherein the controller generates the message indicating that the ambient light level is inadequate when both the image transmit key has been pressed and the ambient light level is lower than the predetermined level.

29. The communication device of claim 27, wherein when the ambient light level measured by the image input camera is above a predetermined level the controller enables the first image data to be transmitted by the image data transceiver.

30. The communication device of claim 27, wherein the display is also capable of displaying the second image data received from another communication device.

31. The communication device of claim 27, further comprising a lighting device for providing illumination when the ambient light level is below the predetermined level as the first image data is captured by the image data transceiver.

32. The communication device of claim 31, further comprising a switch for switching between the message indicating that the ambient light level is inadequate and the lighting device, wherein the controller controls the switch based on the ambient light level measured by the image input camera.

33. The communication device of claim 31, further comprising:
    an internal battery for providing power to device components;
    an energy level detector for detecting a remaining energy level of the battery; and
    a sampling rate calculator for calculating a sampling rate at which transmission image data is to be sampled by the controller based on the remaining energy level detected by the energy level detector.

34. The communication device of claim 27, wherein the image input camera measures the ambient light level based on the first image data.

35. The communication device of claim 27, wherein the communication device transmits and receives data via a wireless communication link.

36. The communication device of claim 27, further comprising a notifying device selectively activated by the controller for notifying a receiving party that the communication device is in a location where the ambient light level measured by the image input camera is below the predetermined level.

37. The communication device of claim 27, wherein if the measured light level is equal to or larger than the predetermined light level, a communication speed is set to accommodate voice and image transmission which is a communication speed higher than when the measured light level is lower than the predetermined light level at which time a communication speed is set lower than a voice and image communication speed which corresponds to a voice only communication speed.

38. The communication device of claim 27, wherein the communication speed is changed according to the ambient light level.

39. A communication device comprising:
    a light sensor for sensing an ambient light level;
    an image input camera for capturing a first image;
    a voice data transceiver for receiving and transmitting voice data;
    an image data transceiver for transmitting the first image data and receiving second image data;
    an image transmit key for initiating an image data transmit state; and
    a controller for controlling an operation state of the communication device, the operation state including an image and voice data transmission state and a voice data transmission state;
    wherein when the image transmit key is pressed during the voice data transmission state, the controller compares the ambient light level with a predetermined level,
    if the ambient light level is higher than the predetermined level, the controller enables the image and voice data transmission state.

40. The communication device of claim 39, wherein if the ambient light level is lower than the predetermined level when the image transmit key is pressed during the voice data transmission state, the controller maintains the voice data transmission state.

* * * * *